(12) United States Patent
Walker et al.

(10) Patent No.: US 12,366,258 B2
(45) Date of Patent: Jul. 22, 2025

(54) CONNECTOR APPARATUSES

(71) Applicant: TruBlue, LLC, Louisville, CO (US)

(72) Inventors: Ryan Daniel Walker, Broomfield, CO (US); Rich Reynolds, Arvada, CO (US)

(73) Assignee: TruBlue, LLC, Louisville, CO (US)

( * ) Notice: Subject to any disclaimer, the term of this patent is extended or adjusted under 35 U.S.C. 154(b) by 547 days.

(21) Appl. No.: 17/726,784

(22) Filed: Apr. 22, 2022

(65) Prior Publication Data

US 2022/0341445 A1 Oct. 27, 2022

Related U.S. Application Data

(60) Provisional application No. 63/179,064, filed on Apr. 23, 2021.

(51) Int. Cl.
*F16B 2/20* (2006.01)
*A62B 35/00* (2006.01)
*A63B 71/00* (2006.01)

(52) U.S. Cl.
CPC ............ *F16B 2/20* (2013.01); *A62B 35/0037* (2013.01); *A63B 71/0054* (2013.01)

(58) Field of Classification Search
CPC ............ A62B 35/0037; A62B 35/0075; A62B 35/0087; A63B 71/0054; F16B 2/20
See application file for complete search history.

(56) References Cited

U.S. PATENT DOCUMENTS

| 3,194,598 | A | * | 7/1965 | Goldfuss | B66C 1/36 |
| | | | | | 294/82.19 |
| 4,290,637 | A | | 9/1981 | Fischer et al. | |
| 6,390,952 | B1 | | 5/2002 | Wilson | |
| 10,398,939 | B1 | | 9/2019 | Siegel | |
| 10,512,822 | B2 | | 12/2019 | Petrov et al. | |
| 2010/0314196 | A1 | | 12/2010 | De Boeck | |
| 2013/0213735 | A1 | | 8/2013 | Dehondt et al. | |

(Continued)

FOREIGN PATENT DOCUMENTS

| EP | 2397191 | 12/2011 |
| EP | 2525878 | 11/2012 |
| EP | 3115084 | 1/2017 |

(Continued)

OTHER PUBLICATIONS

European Extended Search Report in Application 22169360.9, mailed Sep. 13, 2022, 9 pages.

*Primary Examiner* — Minh N Trinh

(74) *Attorney, Agent, or Firm* — Merchant & Gould P.C.

(57) ABSTRACT

A connector apparatus includes a first connector and a second connector. A housing defines a first channel and a second channel and a locking mechanism configured to secure one of the first and second connectors within the first channel or the second channel. The locking mechanism includes a disk with a rotational stop, and a latch arm pivotable between at least a latched position and an unlatched position. When the first connector is secured within the first channel by the disk and the second connector is inserted into the second channel, the second connector actuates the latch arm towards the unlatched position such that the disk is enabled to pivot and secure the second connector to the housing while simultaneously releasing the first connector from the housing.

9 Claims, 7 Drawing Sheets

(56) References Cited

U.S. PATENT DOCUMENTS

2017/0274230 A1    9/2017  Perner
2022/0341445 A1*  10/2022  Walker ............... A62B 35/0075

FOREIGN PATENT DOCUMENTS

| EP | 3237078 | 11/2017 |
| EP | 3363501 | 8/2018 |
| FR | 2972361 | 7/2013 |
| GB | 2538943 | 12/2016 |
| GB | 2552182 | 1/2018 |
| GB | 2567640 | 4/2019 |
| KR | 101824385 | 2/2018 |
| KR | 10-2042355 | 11/2019 |
| NZ | 610838 | 11/2014 |
| RU | 2702024 | 10/2019 |
| WO | 2013/021204 | 2/2013 |

* cited by examiner

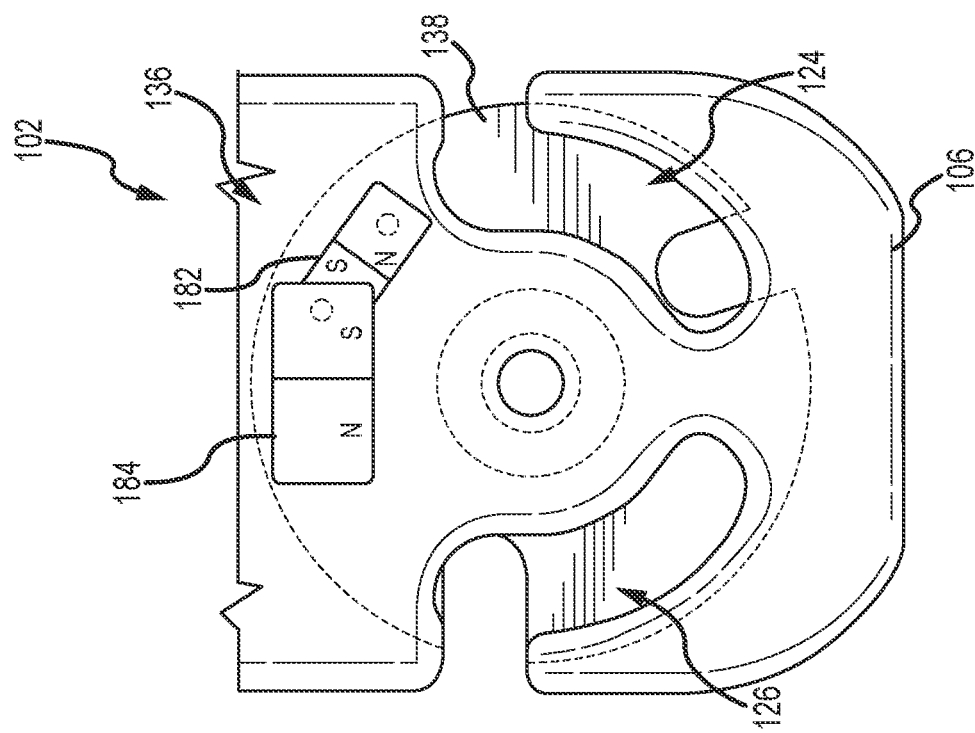
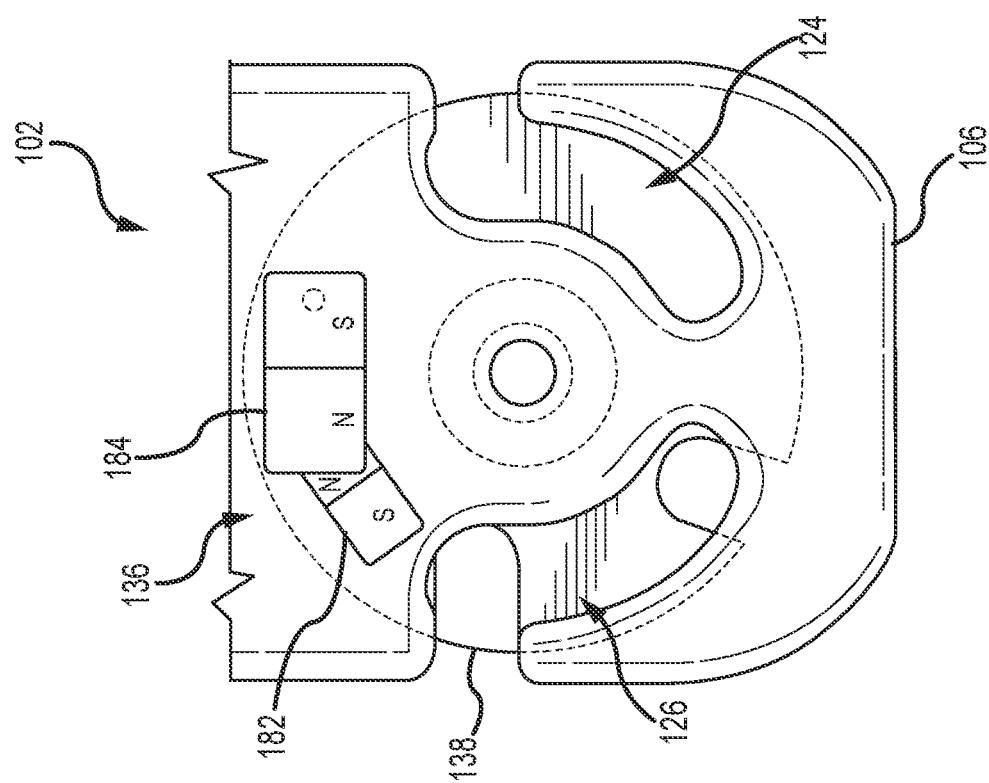

CONNECTOR APPARATUSES

CROSS-REFERENCE TO RELATED APPLICATIONS

This application claims priority to and the benefit of U.S. Provisional Application No. 63/179,064, filed Apr. 23, 2021, which is incorporated by reference herein in its entirety.

INTRODUCTION

Line dispensing devices, such as auto-belay devices used for climbing or descender devices for workers or conveyances, can be used to protect against falls by retracting slack when the line is not under load and providing a braking force when the line is loaded, so that the weight (e.g., climber) on the end of the line descends at a safe speed. Users of these line dispensing devices, however, can unintentionally missconnect to the line dispensing device, thereby creating safety issues. Additionally, users of the line dispensing devices can release the line prior to connecting or after finishing with the line dispensing device, thereby allowing the line to undesirably retract.

Belay devices can be used to ensure that the user is safely connected to the line dispensing device and to prevent the user from unintentionally releasing the line. These belay devices include a line connector component that is mounted to an end of the line of the line dispensing device, a ground/wall anchor component that couples with the line connector component to anchor the line to a base of a wall (e.g., climbing wall) when not in use, and a harness connector component attached to the user's harness that couples with the line connector component to secure the harness to the line dispensing device. Both the ground/wall anchor component and the harness connector component have a separate and unique key configuration to ensure that only one component is coupled to the line connector component at a time and the other component can only be used to release the line connector component coupling.

However, known belay devices have a harness connector component with a specialized shape to connect to the line connector component. These specialized shapes are costly to manufacture and are difficult to attach to user harnesses. Additionally, known belay devices have a key with the ground/wall anchor component that is a high wear component, and that once worn, renders the component inoperable. Accordingly, improvement to belay devices are desired.

Connector Apparatuses

This disclosure describes examples of a connector apparatus for use in aerial amusement activities, such as, but not limited to, climbing wall activities that use auto-belays. In the connector apparatus described herein, features are described that increase the performance of the device. For example, the connector apparatus includes a connector component with a housing and a locking mechanism. A first quick link connector can be secured to the connector component and only released when a second quick link connector is being secured to the connector component. The locking mechanism includes a rotatable disk that is configured to secure the quick link connector to the housing of the connector component and with redundant safety features. Accordingly, a high performing and more efficient connector apparatus is provided.

In an aspect, the technology relates to a connector apparatus including: a first quick link connector and a second quick link connector; a housing defining a first channel and a second channel, the first channel and the second channel each sized and shaped to receive at least a portion of each of the first and second quick link connectors; and a locking mechanism configured to selectively secure one of the first and second quick link connectors within the first channel or the second channel of the housing, the locking mechanism including: a disk pivotably mounted at least partially within the housing and including at least one rotational stop; and at least one latch arm disposed within the housing and selectively pivotable between at least a latched position, whereby the at least one latch arm is engaged with the at least one rotational stop of the disk, and an unlatched position, whereby the at least one latch arm is disengaged with the at least one rotational stop of the disk, and wherein when the first quick link connector is secured within the first channel by the disk and the second quick link connector is inserted into the second channel, the second quick link connector actuates the at least one latch arm towards the unlatched position such that the disk is enabled to pivot and secure the second quick link connector to the housing while simultaneously releasing the first quick link connector from the housing.

In an example, the first quick link connector is identical to the second quick link connector. In another example, each of the first and second quick link connector comprise a protrusion configured to be received by the housing. In still another example, the at least one latch arm includes a magnet, and the second quick link connector magnetically actuates the at least one latch arm towards the unlatched position. In yet another example, the at least one latch arm is biased towards the latched position. In an example, the housing defines a longitudinal axis, the first channel and the second channel symmetrical relative to the longitudinal axis.

In another example, the first channel and the second channel have a dog-leg shape that requires both sliding movement and rotational movement of the first and second quick link connectors therethrough. In still another example, the at least one latch arm is disposed on a first side of the disk, the locking mechanism further including a pair of magnets disposed on a second side of the disk, a first magnet of the pair of magnets coupled to the disk and a second magnet of the pair of magnets coupled to the housing, the pair of magnets generating a repellant force to bias pivoting movement of the disk. In yet another example, the disk has a pair of discrete notches defined in an outer perimeter sized and shaped to at least partially receive at least a portion of the first and second quick link connectors. In an example, the at least one latch arm includes a pair of latch arms, and the at least one rotational stop comprises a pair of corresponding rotational stops.

In another aspect, the technology relates to a connector apparatus including: a housing defining a pair of symmetrical opposing channels sized and shaped to receive at least a portion of a quick link connector; a disk pivotably mounted at least partially within the housing, the disk having a pair of discrete notches defined in an outer perimeter sized and shaped to at least partially receive at least a portion of the quick link connector, the disk pivotable about a rotation axis such that when a first notch is aligned at an opening of a first channel, a second notch is disposed at a distal end of a second housing channel; and a pair of latch arms mounted within the housing and configured to selectively engage with the disk so as to lock rotation thereof, each of the pair of latch arms biased towards a latched position with respect to the disk and having at least one magnet mounted thereto, wherein to secure a first quick link connector to the connector apparatus, the first quick link connector is inserted into the first notch of the disk at the opening of the first channel and disengages a first latch arm via the magnet such that the first quick link connector is movable within the first channel towards a distal end pivoting the disk in a first direction to secure the first quick link connector to the connector apparatus; and wherein to release the first quick link connector from the connector apparatus, a second quick link connector is inserted into the second notch of the disk at an opening of the second channel to disengage a second latch arm via the magnet such that the second quick link connector is movable within the second channel towards the distal end pivoting the disk in an opposite second direction to release the first quick link connector and to secure the second quick link connector to the connector apparatus.

In an example, the disk includes a first magnet disposed opposite the pair of latch arms and the housing includes a second magnet, the first and second magnets generating a repellant force relative to each other. In another example, the first and second quick link connectors are identical to one another and include a protrusion received by the channels of the housing. In still another example, movement of the protrusion through the channels of the housing requires both sliding movement and rotational movement of the protrusion. In yet another example, the pair of latch arms are biased towards the latched position.

In another aspect, the technology relates to a method of connecting to a connector apparatus, the connector apparatus including a housing defining a first channel and a second channel, and a locking mechanism having a disk with at least one rotational stop and at least one latch arm, the method including: providing a first quick link connector secured within the first channel of the housing via the locking mechanism, wherein the at least one latch arm is in a latched position and engaged with the at least one rotational stop to prevent pivoting movement of the disk and release of the first quick link connector; inserting a second quick link connector into the second channel of the housing; during insertion of the second quick link connector, actuating the at least one latch arm towards an unlatched position and disengaged with the at least one rotation stop to allow pivoting movement of the disk; and pivoting the disk via the second quick link connector to secure the second quick link connector to the housing while simultaneously releasing the first quick link connector from the housing, wherein the first channel and the second channel are each sized and shaped to receive at least a portion of each of the first and second quick link connectors.

In an example, the first quick link connector is identical to the second quick link connector. In another example, the at least one latch arm includes a magnet, and actuating the at least one latch arm includes magnetically actuating the at least one latch arm towards the unlatched position. In still another example, inserting the second quick link connector into the second channel of the housing includes both sliding and rotating the second quick link connector relative to the housing. In yet another example, the disk includes a first magnet and the housing includes a second magnet, the first magnet and the second magnet generating a repellant force, and wherein pivoting the disk via the second quick link connector includes overcoming the repellant force of the first and second magnets.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

FIG. 6 is a rear side view of the locking mechanism.

FIG. 7 is another rear side view of the locking mechanism.

DETAILED DESCRIPTION

Figure 1:
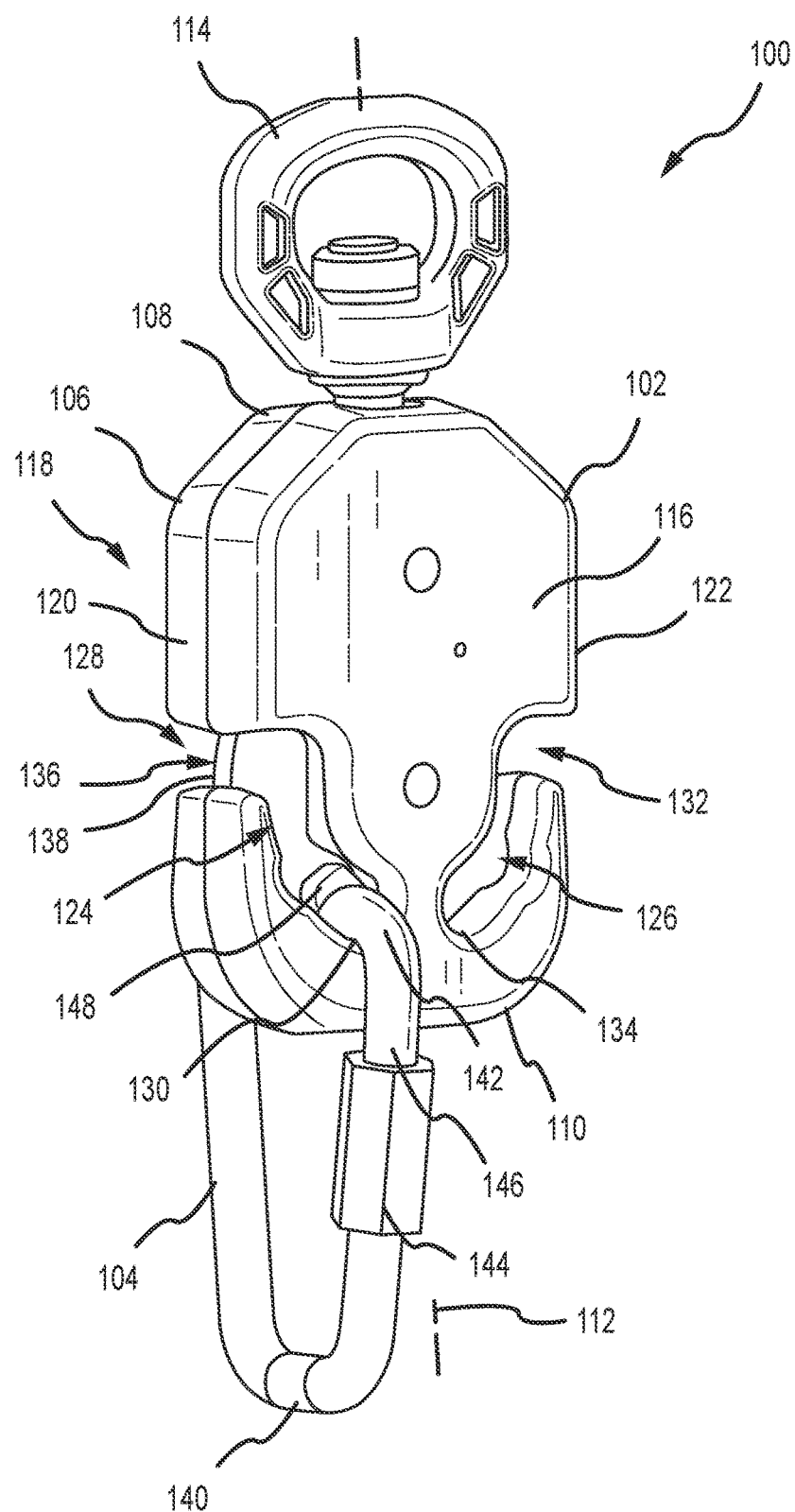
FIG. 1 is a perspective view of an exemplary connector apparatus.

This disclosure describes examples of a connector apparatus for use in aerial amusement activities, such as, but not limited to, climbing wall activities that use auto-belays. Although, the features of the connector apparatus described herein can also be used in any other line braking system (e.g., industrial or occupational descender devices, such as personnel, equipment, or training, recreational descender devices, such as conveyances, rides, trolleys, ziplining, free-fall devices, and the like) as required or desired. The connector apparatus provides various improvements for belay devices that increase user efficiencies and safety.

In the connector apparatus described herein, features are described that increase the performance of the device. For example, a same or similar quick link connector may be used for both a user harness connection and an anchor connection. These quick link connectors are economical so that they can be applied to harness fleets at climbing gyms, adventure parks, and the like. As such, a specialized key, which is a high wear component, is no longer needed to release the user harness connection. Additionally, the connector apparatus provides redundant safety features to increase performance. Accordingly, a high performing and more efficient connector apparatus is provided.

The connector apparatus includes a connector component with a housing and a locking mechanism. A first quick link connector can be secured to the connector component and only released when a second quick link connector is being secured to the connector component. As such, users of the connector apparatus are reduced or prevented from miss-connecting the harness to the auto-belay, thereby increasing safety. Additionally, users of the connector apparatus are reduced or prevented from releasing the line of the auto-belay prior to connecting or after finishing with the auto-belay, thereby reducing or preventing line retraction.

The locking mechanism includes a rotatable disk that is configured to secure the quick link connector to the housing of the connector component. The locking mechanism includes a pair of latch arms that selectively engage the disk to prevent rotation thereof. The latch arms are actuated by the quick link connectors, for example, via magnets, so as to simultaneously secure and release the quick link connectors. Additionally, the locking mechanism may include a pair of magnets that generate a repellant force so as to bias the rotational position of the disk during twisting of the connector apparatus. Furthermore, the channels of the housing that receive the quick link connectors may have a labyrinth configuration so that during insertion and removal of the quick link connectors, the quick link connector both slides and rotates to move through the channels. This further reduces release during twisting of the connector apparatus. Many other features of the line dispensing device are described further below.

Throughout this description, references to orientation (e.g., front(ward), rear(ward), top, bottom, back, right, left, upper, lower, etc.) of the connector apparatus relate to their position when installed on an auto-bely and are used for ease of description and illustration only. No restriction is intended by use of the terms regardless of how the connector apparatus is situated on its own. As used herein, the terms "axial" and "longitudinal" refer to directions and orientations, which extend substantially parallel to a centerline of the component or system. Moreover, the terms "radial" and "radially" refer to directions and orientations, which extend substantially perpendicular to the centerline of the component or system. In addition, as used herein, the term "circumferential" and "circumferentially" refer to directions and orientations, which extend arcuately about the centerline of the component or system.

FIG. 1 is a perspective view of an exemplary connector apparatus 100. The connector apparatus 100 is configured to be used in aerial amusement actives (e.g., climbing walls, climbing structures, etc.) and climbing competitions. The connector apparatus 100 includes a connector component 102 and a plurality of quick link connectors 104. The connector component 102 is configured to connect to a line of a line dispensing device (not shown) and so that a user (e.g., climber) with a harness can utilize the quick link connector 104 to attach the harness to the line dispensing device. Additionally, the line of the line dispensing device can be anchored when not in use via the connector component 102 so that the line does not undesirably retract within the line dispensing device. The line dispensing device may be an auto-belay device used for climbing walls. Examples of auto-belays are the TRUBLUE iQ and TRUBLUE SPEED from TruBlue LLC d/b/a Head Rush Technologies.

The connector component 102 includes a housing 106 with a first end 108 and an opposite second end 110. A longitudinal axis 112 is defined between the first end 108 and the second end 110. A swivel loop 114 is rotatably coupled to the housing 106 at the first end 108 with bearings or bearing material and is freely rotatable around the longitudinal axis 112 relative to the housing 106. The swivel loop 114 is configured to be secured to the line (e.g., webbing, rope, cable, etc.) of the line dispensing device. The housing 106 includes a front side 116, a rear side 118, a left sidewall 120, and a right sidewall 122, such that the housing 106 is substantially rectangular in shape that is tapered at the first end 108. The tapered shape at the first end 108 provides an ergonomic and identifiable grip for the user to assist with making the connection to the quick link connector 104. The size and weight of the connector component 102 are smaller then other belay devices so as to increase ease of use for the user.

The housing 106 defines a first channel 124 and a second channel 126, both sized and shaped to receive a portion of the quick link connector 104. The first channel 124 extends inward from an opening 128 on the left sidewall 120 to a distal end 130 within the housing 106. The second channel 126 also extends inward from an opening 132 on the right sidewall 122 to a distal end 134 within the housing 106. Both of the first channel 124 and the second channel 126 extend between the front side 116 and the rear side 118 of the housing 106. In an aspect, the first channel 124 and the second channel 126 are symmetrical relative to the longitudinal axis 112.

The connector component 102 also includes a locking mechanism 136 that is configured to selectively secure the quick link connector 104 to the housing 106 and within one of the first channel 124 or the second channel 126. In the example, the locking mechanism 136 has a pivotable disk 138 for securing the quick link connector 104 within the first channel 124 or the second channel 126. The locking mechanism 136 is described further below in reference to FIGS. 2-7.

The quick link connector 104 is configured to be attached to a user's harness or a ground wall anchor at one end 140 and to removably couple to the connector component 102 at an opposite end 142. In the example, the quick link connector 104 is a maillon type connector with a threaded sleeve 144 that tightens over a threaded nose 146. It is appreciated that other types of connectors, such as, but not limited to, locking carabiners and hooks, may be used that facilitate operation of the connector apparatus 100 as described herein.

The connector apparatus 100 described herein uses two identical quick link connectors 104 for operation; although only one quick link connector is shown in FIG. 1 for clarity. By having two quick link connectors 104, one quick link connector may be semi-permanently attached to a user's harness while the second quick link connector may be semi-permanently attached to a ground or wall anchor (e.g., via webbing or the like). By using the maillon type connector, the quick link connector 104 is more securely attached to the harness and anchor, but can still be removed as required or desired. In an aspect, a tool (e.g., a wrench) may be required to release the sleeve 144 so that a user cannot detach the quick link connector 104 from the harness or anchor without use of the tool.

The connector component 102 is configured to be secured to only one quick link connector 104 at a time, and the other quick link connector that is not connected, is used to release the secured quick link connector 104 while simultaneously being captured and secure by the connector component 102 itself. As such, users of the connector apparatus 100 are reduced or prevented from miss-connecting the harness to the line dispensing device, thereby increasing safety. Additionally, users of the connector apparatus 100 are reduced or prevented from releasing the line of the line dispensing device prior to connecting or after finishing with the line dispensing device, thereby reducing or preventing line retraction. In operation, the quick link connector 104 is a component that is cost effective to manufacture so that many quick link connectors can be pre-attached to harness and to anchors for auto-belays.

In the example, the end 142 of the quick link connector 104 that couples to the connector component 102 may include a protrusion 148 to assist with securing the quick link connector 104 to the connector component 102. However, the protrusion 148 is useable in both the first and second channels 124, 126, and thus, the protrusion is not a unique key. Additionally, the protrusion 148 is a highly wear resistant shape (e.g., a triangular shape with two oblique surfaces).

Figure 2:
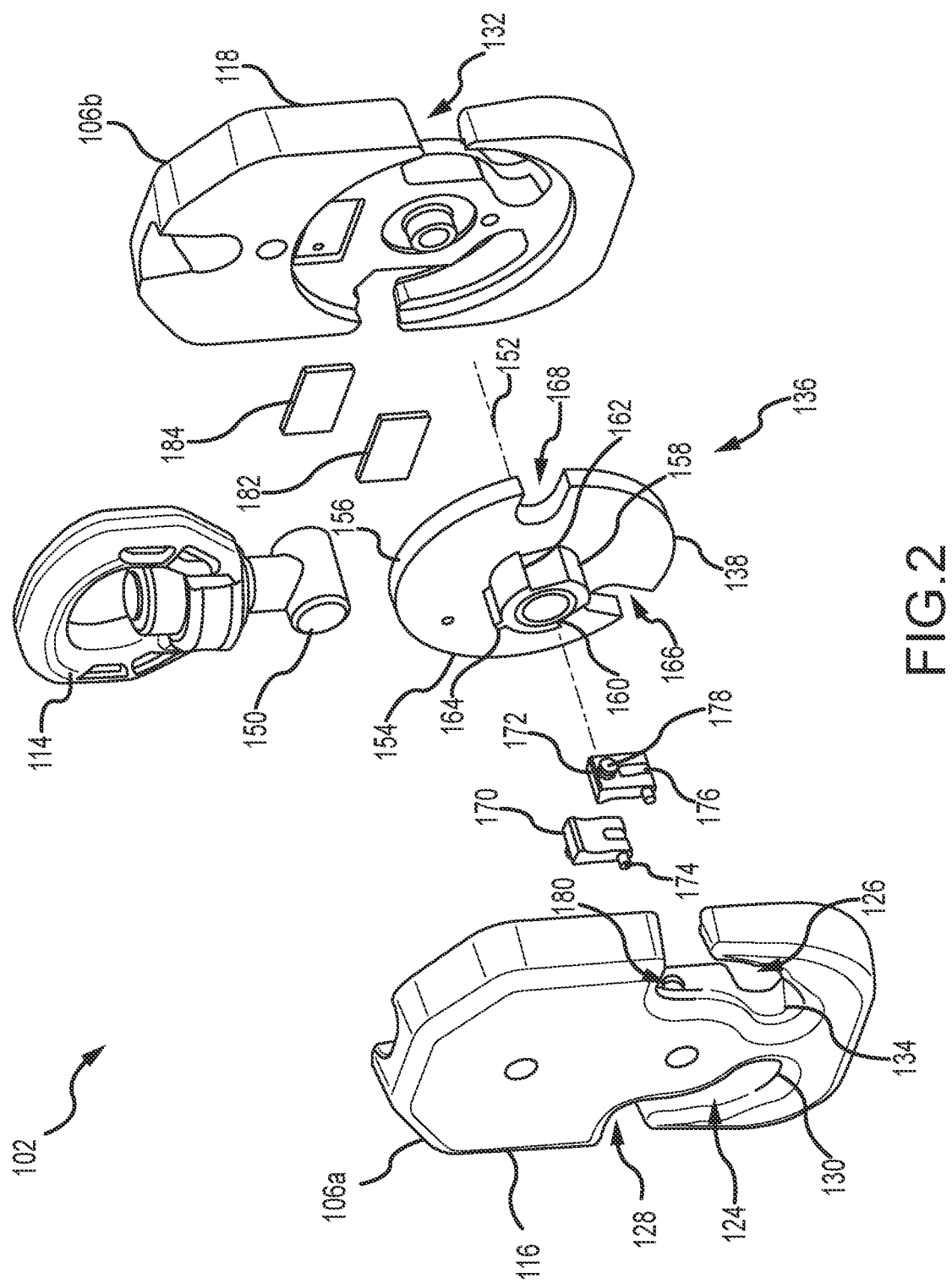
FIG. 2 is an exploded perspective view of a connector component of the connector apparatus shown in FIG. 1.

FIG. 2 is an exploded perspective view of the connector component 102 of the connector apparatus 100 (shown in FIG. 1). The connector component 102 includes a two piece housing 106a, 106b that houses the locking mechanism 136 and supports the swivel loop 114. The connector component 102 is load rated so that the user can be properly connected to the line dispensing device as described above. The two piece housing 106a, 106b also allows for the locking mechanism 136 and the swivel loop 114 to be inspected and components replaced as required or desired. The swivel loop 114 is rotatably coupled to a post 150 that couples to the top end of the housing 106.

The locking mechanism 136 is supported at least partially within the housing 106 and includes the disk 138 that is pivotably mounted at least partially within the housing 106. The disk 138 is pivotable around a pivot axis 152 that is orthogonal to the longitudinal axis 112 (shown in FIG. 1). As such, the disk 138 has a front side 154 that faces the front side 116 of the housing 106 and an opposite rear side 156 that faces the rear side 118 of the housing 106. The disk 138 being oriented parallel to the front and rear sides 116, 118 of the housing 106. The front side 154 of the disk 138 includes a hub 158 protruding therefrom. The hub 158 includes a first rotational stop 160 and a second rotational stop 162. In the example, the first and second rotational stops 160, 162 are formed as radial steps within the hub 158. The hub 158 may also include a tab 164 radially extending from the hub 158. The first and second rotational stops 160, 162 are symmetrically positioned on the hub 158 relative to the tab 164.

The disk 138 also has a first notch 166 and a second notch 168 defined in its outer perimeter and through the front and rear sides 154, 156. The notches 166, 168 extend radially inwards within the disk 138 towards the corresponding rotational stop 160, 162. The notches 166, 168 are sized and shaped to at least partially receive the quick link connector 104 (shown in FIG. 1). The notches 166, 168 may be substantially U-shaped. In the example, the notches 166, 168 are spaced about 120° apart from each other. This configuration enables for the second notch 168 to be aligned with the opening 132 of the second channel 126 and the first notch 166 to be aligned with the distal end 130 of the first channel 124, while conversely, when the first notch 166 is aligned with the opening 128 of the first channel 124, the second notch 168 is aligned with the distal end 134 of the second channel 126.

The locking mechanism 136 also includes a first latch arm 170 and a second latch arm 172 that are pivotably mounted to the housing 106. The latch arms 170, 172 are configured to selectively engage with the hub 158 of the disk 138 so as to lock rotation thereof about the pivot axis 152. One end of the first and second latch arms 170, 172 includes a pivot pin 174 that the latch arm pivots about. The first and second latch arms 170, 172 each include a biasing member 176 (e.g., a torsion spring about the pivot pin 174) so as to bias the position of the latch arms towards a latched position as described further below. An opposite end of the first and second latch arms 170, 172 includes a magnet 178. The magnet 178 of each latch arm faces towards the corresponding sidewall 120, 122 of the housing 106. In an example, the housing 106 includes a hole 180 positioned at the opening 128, 132 of the first and second channels 124, 126 that the magnet 178 is aligned with.

In the example, the locking mechanism 136 further includes a first magnet 182 that is coupled to the rear side 156 of the disk 138 and rotatable therewith. A second magnet 184 is coupled to the housing 106 and is secured in a fixed position relative to the first magnet 182. The first magnet 182 and the second magnet 184 are configured to generate a repellant force relative to one another and so as to bias a pivoting movement of the disk 138. The magnets 182, 184 are described further below in reference to FIGS. 6-7.

Figure 3:
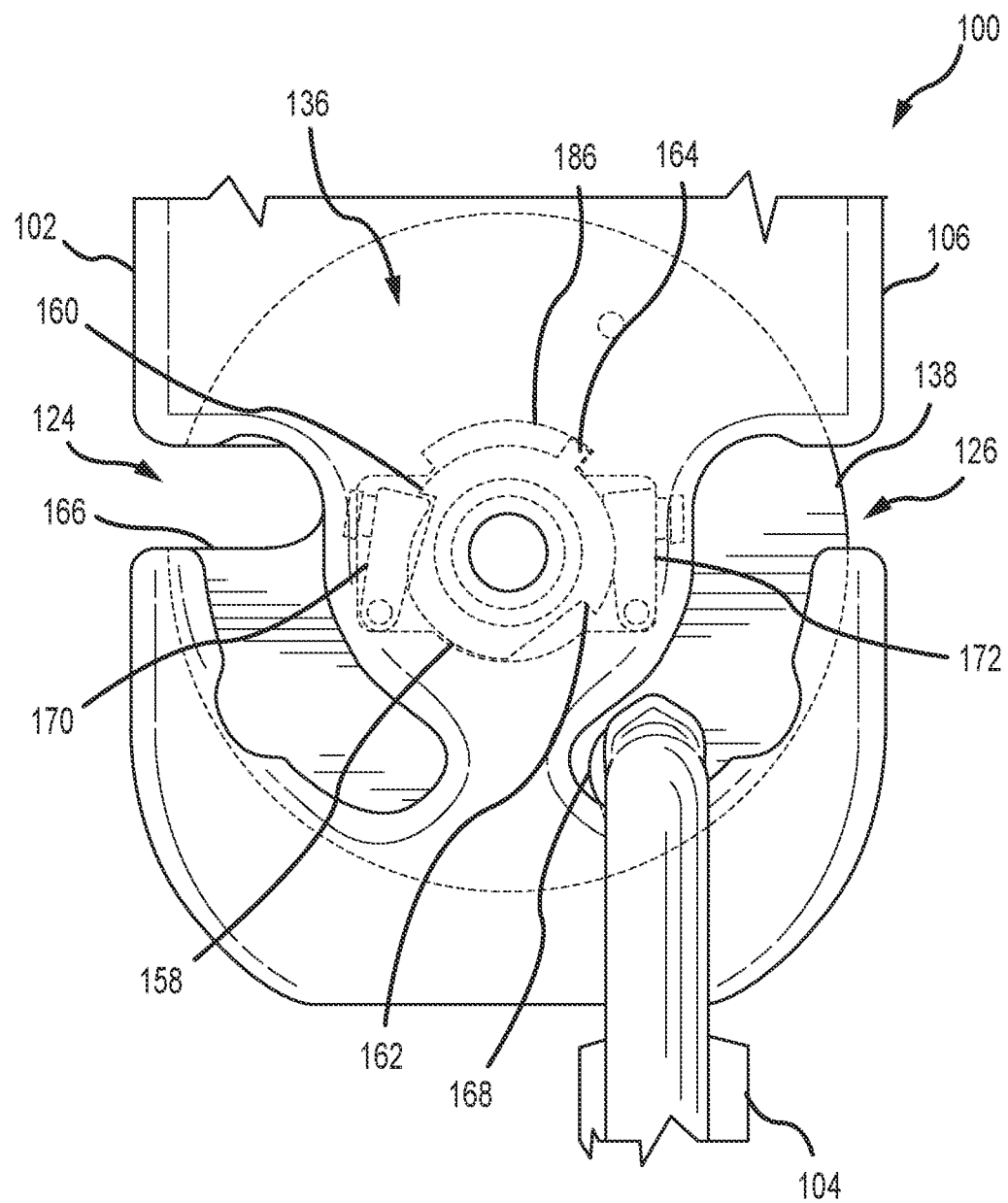
FIG. 3 is a front side view of a locking mechanism of the connector apparatus shown in FIG. 1.

FIG. 3 is a front side view of the locking mechanism 136 of the connector apparatus 100. The housing 106 of the connector component 102 is illustrated as transparent so as to view the components of the locking mechanism 136 therein. As illustrated in FIG. 3, the quick link connector 104 is secured within the distal end of the second channel 126 via the locking mechanism 136. In this configuration, the disk 138 is prevented from pivoting such that the quick link connector 104 cannot be removed from the second channel 126 unless released via insertion of a second quick link connector (not shown) into the first channel 124.

When the quick link connector 104 is at the distal end of the second channel 126, the second notch 168 of the disk 138 is positioned at the distal end of the second channel 126. This rotational position of the disk 138 orients the first notch 166 of the disk 138 at the opening of the first channel 124. The first latch arm 170 is in a latched position, whereby the latch arm 170 is engaged with the first rotational stop 160 of the disk 138. The biasing member 176 (shown in FIG. 2) of the latch arm 170 biases the latch arm 170 towards the latched position. The latched position of the first latch arm 170 prevents counter-clockwise rotation of the disk 138 when viewed from the front side. Thus, the quick link connector 104 is prevented from traveling though the second channel 126 towards the opening. Over-rotation of the disk 138 in the clockwise direction when viewed from the front side is restricted by the tab 164 sliding within a recess 186 defined by the housing 106 and the stop formed by the end of the recess 186.

In the example, the second latch arm 172 is in an unlatched position, whereby the latch arm 172 is disengaged with the rotational stop 162 of the disk 138. However, the biasing member 176 of the latch arm 172 is urging the latch arm 172 into the hub 158 of the disk 138. The engagement of the housing 106 with the disk 138 (e.g., the rotational stop 160 and the tab 164) prevents rotational movement of the disk 138 even when the user is twisting and falling when attached to the auto-belay. As such, the quick link connector 104 is secured to the connector component 102.

Figure 4:
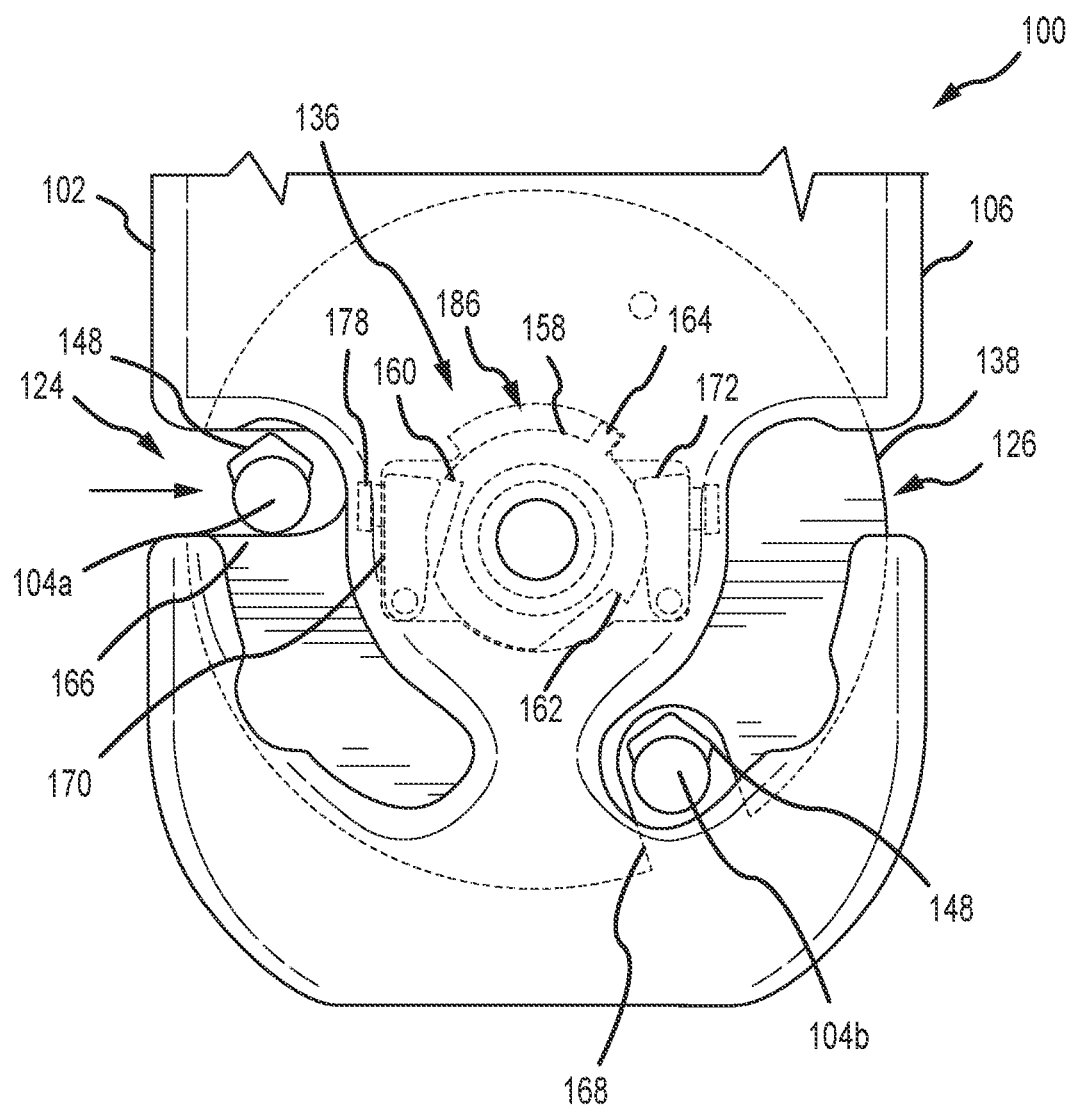
FIG. 4 is another front side view of the locking mechanism.

FIG. 4 is another front side view of the locking mechanism 136 of the connector apparatus 100. The housing 106 of the connector component 102 is illustrated as transparent so as to view the components of the locking mechanism 136 therein. Additionally, the quick link connectors 104a, 104b are illustrated schematically for clarity. In order to release the quick link connector 104b from the second channel 126, a separate quick link connector 104a is used and is inserted into the first channel 124 and the first notch 166 of the disk 138 that is positioned at the opening thereof. In an aspect, the protrusion 148 is inserted into the channels 124, 126 and captured by the locking mechanism 136.

As the quick link connector 104a is inserted into the first channel 124 and the first notch 166, the quick link connector 104a actuates the first latch arm 170 towards an unlatched position as illustrated in FIG. 4. In the unlatched position, the first latch arm 170 pivots towards the quick link connector 104a and away from the hub 158 of the disk 138. As such, the first latch arm 170 disengages with the first rotational stop 160 of the disk 138. The unlatched position of the first latch arm 170 enables the disk 138 to pivot in a counter-clockwise direction when viewed from the front side. Furthermore, the tab 164 of the hub 158 can also slide within the recess 186 in a counter-clockwise direction. The second latch arm 172 remains disengaged from the second rotational stop 162 of the disk 138 so that the disk 138 can be moved by the user.

In the example, the quick link connector 104*a* magnetically actuates the first latch arm 170 via the magnet 178 attached thereto so as to move the first latch arm 170 to the unlatched position. As such, the quick link connector 104 may be formed from a ferromagnetic material so that when the quick link connector 104 is proximate to one of the latch arms 170, 172, the latch arms move towards their unlatched position. In an aspect, the protrusion 148 of the quick link connector 104 enables the structure of the quick link connector 104 to get closer to the magnet 178 so as to actuate the latch arms 170, 172. The magnetic strength between the quick link connector 104 and the magnet 178 is stronger than the biasing force of the biasing member 176 of the latch arms 170, 172. However, when the quick link connector 104 is moved away from the latch arms 170, 172, the biasing member 176 automatically returns the latch arms to their latched position. The components of the connector component 102 (e.g., housing 106, disk 138, latch arms 170, 172, etc.) may be formed from a non-ferromagnetic material so that interference with the magnetic field of the magnet 178 is reduced or prevented.

Once the first latch arm 170 is unlatched via the quick link connector 104*a* being inserted into the first channel 124, the disk 138 can be rotated by the user in a counter-clockwise direction so as to secure the quick link connector 104*a* to the connector component 102 while simultaneously releasing the quick link connector 104*b* from the second channel 126. In operation, both quick link connectors 104*a*, 104*b* move with the disk 138 and within the notches 166, 168.

Figure 5:
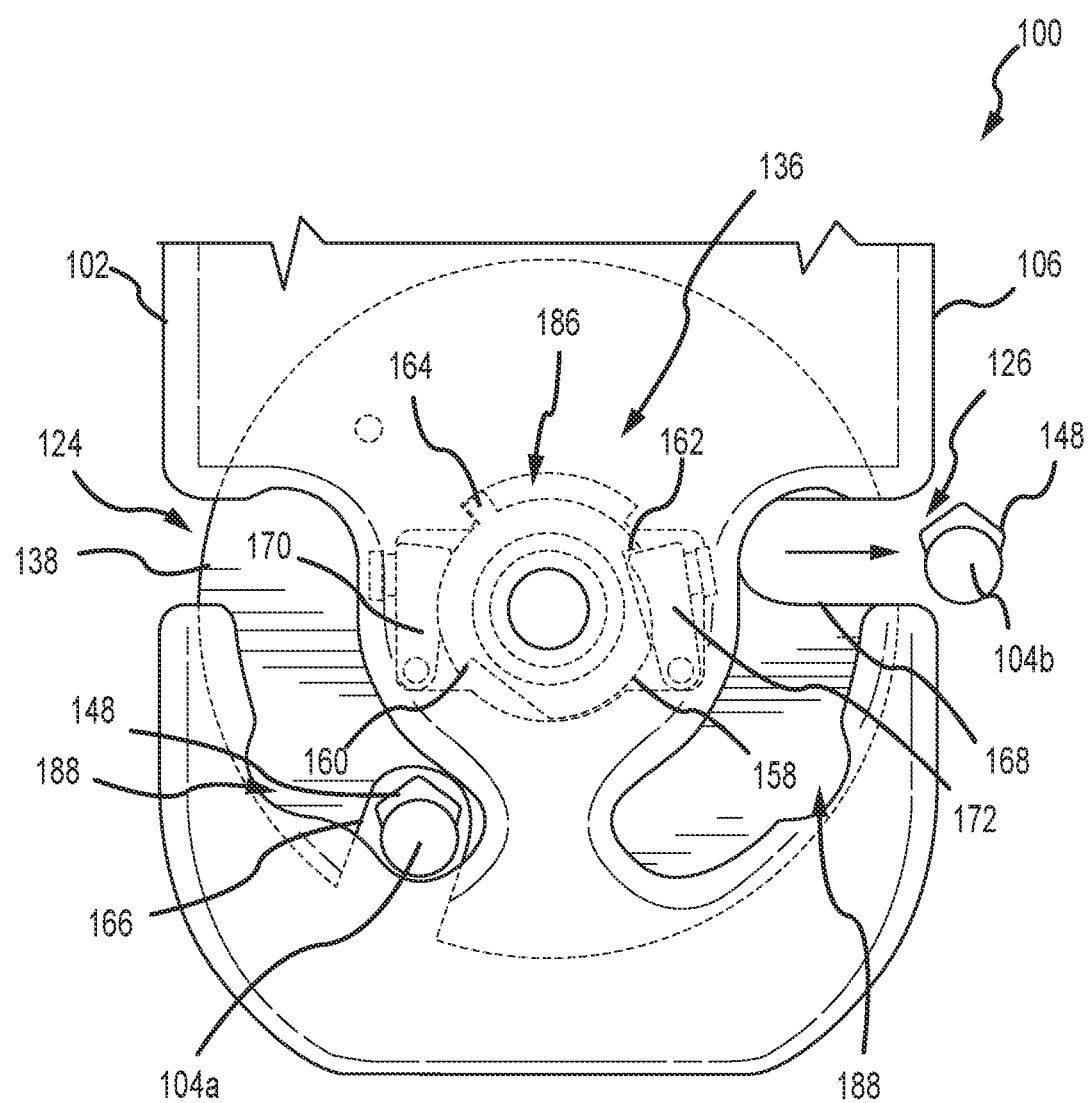
FIG. 5 is another front side view of the locking mechanism.

FIG. 5 is another front side view of the locking mechanism 136 of the connector apparatus 100. The housing 106 of the connector component 102 is illustrated as transparent so as to view the components of the locking mechanism 136 therein. Additionally, the quick link connectors 104*a*, 104*b* are illustrated schematically for clarity. As illustrated in FIG. 5, the quick link connector 104*a* has moved towards the distal end of the first channel 124 and is now secured to the connector component 102. The quick link connector 104*a* rotates the disk 138 so that the second notch 168 aligns with the opening of the second channel 126 and the quick link connector 104*b* is released from the connector component 102 to be removed therefrom. The configuration of FIG. 5 is now the opposite of the configuration shown in FIG. 3 described above.

As illustrated in FIG. 5, the quick link connector 104*a* is secured within the distal end of the first channel 124 via the locking mechanism 136. In this configuration, the disk 138 is prevented from pivoting such that the quick link connector 104*a* cannot be removed from the first channel 124 unless released via reinsertion of the quick link connector 104*b* into the second channel 126.

When the quick link connector 104*a* is at the distal end of the first channel 124, the first notch 166 of the disk 138 is positioned at the distal end of the first channel 124. This rotational position of the disk 138 orients the second notch 168 of the disk 138 at the opening of the second channel 126. The second latch arm 172 is in a latched position, whereby the latch arm 172 is engaged with the second rotational stop 162 of the disk 138. The biasing member 176 (shown in FIG. 2) of the latch arm 172 biases the latch arm 172 towards the latched position. The latched position of the second latch arm 172 prevents clockwise rotation of the disk 138 when viewed from the front side. Thus, the quick link connector 104*a* is prevented from traveling though the first channel 124 towards the opening. Over-rotation of the disk 138 in the counter-clockwise direction when viewed from the front side is restricted by the tab 164 sliding within the recess 186 defined by the housing 106 and the stop formed by the end of the recess 186.

In the example, the first latch arm 170 is in an unlatched position, whereby the latch arm 170 is disengaged with the rotational stop 160 of the disk 138. However, the biasing member 176 of the latch arm 170 is urging the latch arm 170 into the hub 158 of the disk 138. The engagement of the housing 106 with the disk 138 (e.g., the rotational stop 162 and the tab 164) prevents rotational movement of the disk 138 even when the user is twisting and falling when attached to the auto-belay. As such, the quick link connector 104*a* is secured to the connector component 102. In order to release the quick link connector 104*a*, the process described in FIGS. 3-5 is repeated, but with the quick link connector 104*b*. As such, the only way to release one quick link connector 104 is to insert another quick link connector 104. The quick link connectors 104 are not a key, and similar quick link connectors 104 are used to both release the locking mechanism 136 and be secured by the locking mechanism 136.

Both the first channel 124 and the second channel 126 have a dog-leg shape. The dog-leg shape of the channels 124, 126 are such that the quick link connector 104 cannot merely linearly slide between the opening of the channel and the distal end thereof. Rather, because of the protrusion 148 on the quick link connector 104, the quick link connector 104 is required to both linearly slide within the channels 124, 126 and rotate therein. For example, at the corner of the dog leg 188, the protrusion 148 requires rotational movement of the quick link connector 104 in order to make it through the turn. Otherwise, the quick link connector 104 will become wedged between the walls of the channel 124, 126.

The labyrinth path formed by the channels 124, 126 provides an additional safety feature that reduces or prevents undesirable rotation of the disk 138 and release of the quick link connector 104 when the user is twisting and falling on the auto-belay.

FIG. 6 is a rear side view of the locking mechanism 136 of the connector component 102. The housing 106 of the connector component 102 is illustrated as transparent so as to view the components of the locking mechanism 136 therein, and the quick link connector 104 (shown in FIG. 3) is not illustrated for clarity. FIG. 6 is the opposite side view of the configuration illustrated in FIG. 3 described above. On the opposite side of the hub 158 (shown in FIG. 2) of the disk 138, the first magnet 182 is mounted. The first magnet 182 is facing the second magnet 184 that is mounted to the housing 106. As such, the first magnet 182 is rotatable with the disk 138 as it pivots as described above.

The locking mechanism 136 further includes the magnets 182, 182 to provide a third safety feature for the locking mechanism 136. The configuration of FIG. 6, corresponds to the first latch arm 170 being engaged with the first rotational stop 160 (both shown in FIG. 3) so that the disk 138 is prevented from rotating to release the quick link connector 104 from the connector component 102. This can be considered a first safety feature. The quick link connector 104 being disposed at the distal end of the second channel 126 and requiring both sliding and rotational movement to move towards the opening may be considered a second safety feature. The magnets 182, 184 are positioned and oriented so that they generate a repellant force and bias the rotational position of the disk 138 in a counter-clockwise direction when viewed from the rear end.

By using the magnets 182, 184 to generate a biasing force on the disk 138, if the first latch arm 170 moves towards an unlatched position (e.g., via inertia from a user fall or twist), the position of the disk 138 is reduced or prevented from being moved so that the first latch arm 170 easily reengages with the disk 138 and into the latched position via its biasing member. In an aspect, the magnets 182, 184 may be a high strength, rare-earth material magnet (e.g., neodymium) and positioned so that the polarity of the magnets 182, 184 generates the repellant force that is not affected by inertia. The repellant force is such that the user, when using the quick link connector 104 to release the latch arm, can still rotate the magnet 182 past the magnet 184 and overcome the repellant force as required or desired.

While three safety features are described herein that restrict or prevent rotation of the disk 138 and secure the quick link connector 104 to the housing 106, it should be appreciated that all three safety features can be used independently from one another or in addition to each other. Furthermore, two of the three safety features can be used with each other as required or desired.

FIG. 7 is another rear side view of the locking mechanism 136 of the connector component 102. The housing 106 of the connector component 102 is illustrated as transparent so as to view the components of the locking mechanism 136 therein, and the quick link connector 104 (shown in FIG. 5) is not illustrated for clarity. FIG. 7 is the opposite side view of the configuration illustrated in FIG. 5 described above. The configuration of FIG. 7, corresponds to the second latch arm 172 being engaged with the second rotational stop 162 (both shown in FIG. 5) so that the disk 138 is prevented from rotating to release the quick link connector 104 from the connector component 102. The magnets 182, 184 are positioned and oriented so that they generate a repellant force and bias the rotational position of the disk 138 in a clockwise direction when viewed from the rear end. The magnets 182, 184 generate a biasing force on the disk 138, and if the second latch arm 172 moves towards an unlatched position (e.g., via inertia from a user fall or twist), the position of the disk 138 is reduced or prevented from being moved so that the second latch arm 172 easily reengages with the disk 138 and into the latched position via its biasing member.

Figure 8:
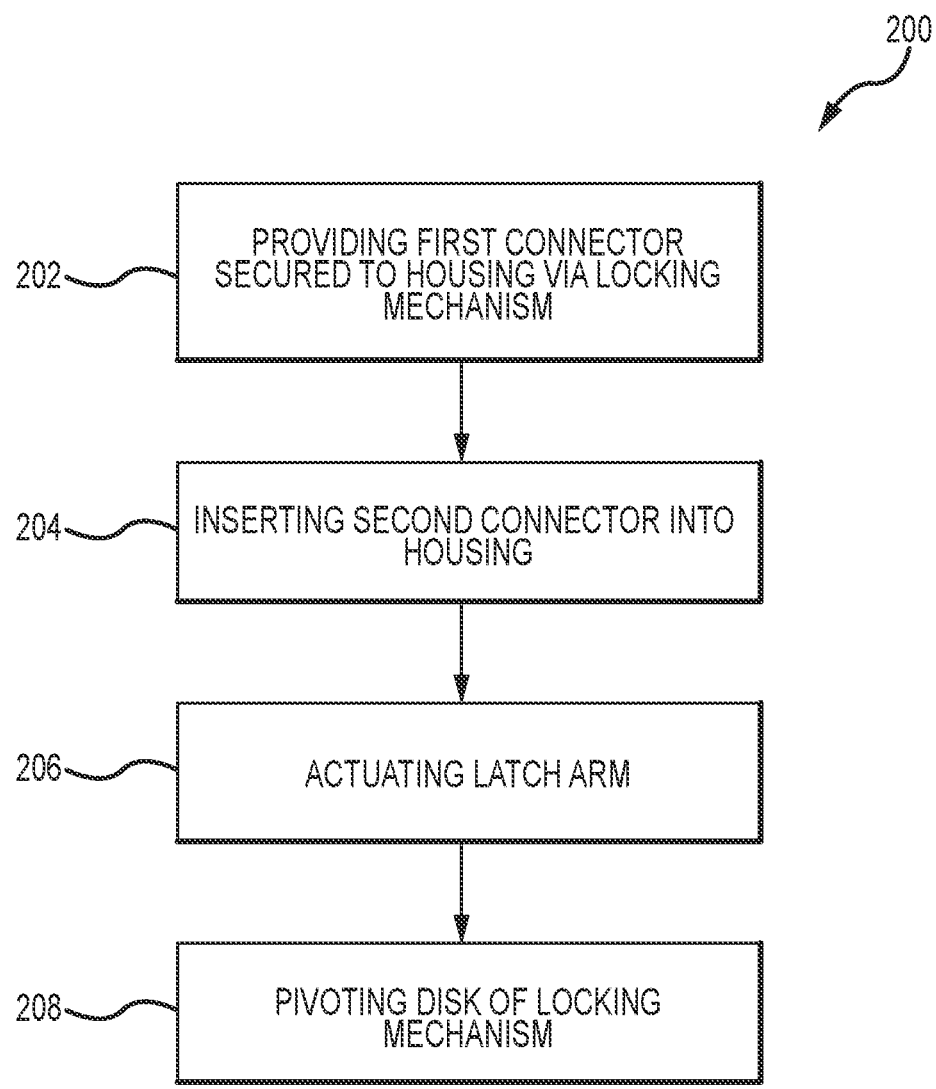
FIG. 8 is a flowchart illustrating an exemplary method of connecting to a connector apparatus.

FIG. 8 is a flowchart illustrating an exemplary method 200 of connecting to a connector apparatus. The connector apparatus may be the same or similar to the connector apparatus 100 described above in reference to FIGS. 1-7. The connector apparatus includes a housing defining a first channel and a second channel, and a locking mechanism having a disk with a rotational stop and a latch arm. In an aspect, the first quick link connector is identical to the second quick link connector.

The method 200 begins with providing a first quick link connector secured within the first channel of the housing via the locking mechanism (operation 202). To secure the first quick link connector, the latch arm is in a latched position and engaged with the rotational stop to prevent pivoting movement of the disk and release of the first quick link connector.

A second quick link connector is inserted into the second channel of the housing (operation 204). In some examples, inserting the second quick link connector into the second channel of the housing includes both sliding and rotating the second quick link connector relative to the housing.

During insertion of the second quick link connector, the method 200 includes actuating the latch arm towards an unlatched position and disengaged with the rotation stop to allow pivoting movement of the disk (operation 206). In examples, the latch arm can include a magnet, and actuating the latch arm includes magnetically actuating the latch arm towards the unlatched position.

Once the latch arm is unlatched, the method includes pivoting the disk via the second quick link connector to secure the second quick link connector to the housing while simultaneously releasing the first quick link connector from the housing (operation 208). The first channel and the second channel are each sized and shaped to receive at least a portion of each of the first and second quick link connectors. In examples, the disk includes a first magnet and the housing includes a second magnet, the first magnet and the second magnet generating a repellant force. As such, pivoting the disk via the second quick link connector includes overcoming the repellant force of the first and second magnets.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While various embodiments have been described for purposes of this disclosure, various changes and modifications may readily suggest themselves to those skilled in the art and may be made which are well within the scope of the present disclosure.

What is claimed is:

1. A connector system comprising:
   a first quick link connector and a second quick link connector; and
   a connector apparatus comprising:
      a housing defining a first channel and a second channel, the first channel and the second channel each sized and shaped to receive at least a portion of each of the first and second quick link connectors; and
      a locking mechanism configured to selectively secure one of the first and second quick link connectors within the first channel or the second channel of the housing, the locking mechanism comprising:
         a disk pivotably mounted at least partially within the housing and including at least one rotational stop, wherein the disk has a pair of discrete notches defined in an outer perimeter sized and shaped to at least partially receive at least a portion of the first and second quick link connectors; and
         at least one latch arm disposed within the housing and selectively pivotable between at least a latched position, whereby the at least one latch arm is engaged with the at least one rotational stop of the disk, and an unlatched position, whereby the at least one latch arm is disengaged with the at least one rotational stop of the disk, and
      wherein when the first quick link connector is secured within the first channel by a first notch of the pair of discrete notches of the disk and the second quick link connector is inserted into the second channel and a second notch of the pair of discrete notches of the disk, the second quick link connector actuates the at least one latch arm towards the unlatched position such that the disk is enabled to pivot and secure the second quick link connector to the housing while simultaneously releasing the first quick link connector from the housing.

2. The connector system of claim 1, wherein the first quick link connector is identical to the second quick link connector.

3. The connector system of claim 2, wherein each of the first and second quick link connectors comprise a protrusion configured to be received by the housing.

4. The connector system of claim 1, wherein the at least one latch arm includes a magnet, and the second quick link connector magnetically actuates the at least one latch arm towards the unlatched position.

5. The connector system of claim 1, wherein the at least one latch arm is biased towards the latched position.

6. The connector system of claim 1, wherein the housing defines a longitudinal axis, the first channel and the second channel symmetrical relative to the longitudinal axis.

7. The connector system of claim 6, wherein the first channel and the second channel have a dog-leg shape with a first portion of the channel parallel to the longitudinal axis and a second portion of the channel non-parallel to the longitudinal axis that requires both sliding movement and rotational movement of the first and second quick link connectors therethrough.

8. The connector system of claim 1, wherein the at least one latch arm is disposed on a first side of the disk, the locking mechanism further comprising a pair of magnets disposed on a second side of the disk, a first magnet of the pair of magnets coupled to the disk and a second magnet of the pair of magnets coupled to the housing, the pair of magnets generating a repellant force to bias pivoting movement of the disk.

9. The connector apparatus system of claim 1, wherein the at least one latch arm includes a pair of latch arms, and the at least one rotational stop comprises a pair of corresponding rotational stops.

* * * * *